United States Patent [19]

Schotz

[11] Patent Number: 4,980,665
[45] Date of Patent: Dec. 25, 1990

[54] REMOTE CONTROL REPEATER

[75] Inventor: Larry Schotz, Cedarburg, Wis.

[73] Assignee: Recoton Corporatoin, Long Island City, N.Y.

[21] Appl. No.: 201,638

[22] Filed: Jun. 2, 1988

Related U.S. Application Data

[63] Continuation-in-part of Ser. No. 53,355, May 22, 1987, Pat. No. 4,829,570, and a continuation-in-part of Ser. No. 127,793, Dec. 2, 1987, Pat. No. 4,847,903.

[51] Int. Cl.$^5$ ............................................. H04M 11/04
[52] U.S. Cl. .................................. 340/310 R; 455/14; 455/23
[58] Field of Search ........................ 340/310 A, 310 R; 455/14, 15, 16, 20, 21, 23; 370/26, 97

[56]           References Cited
           U.S. PATENT DOCUMENTS 3,962,547  6/1976  Pattantyus-Abraham ..... 340/310 R
4,040,046  8/1977  Long et al. ..................... 340/310 A
4,599,598  7/1986  Komada et al. .................... 455/14

Primary Examiner—Joseph A. Orsino
Assistant Examiner—Geoff Sutcliffe
Attorney, Agent, or Firm—Curtis, Morris & Safford

[57]            ABSTRACT

A repeater for receiving data transmitted thereto via a first transmission medium, transmitting that data over AC power lines to a remote location and re-transmitting that data from the remote location via a second transmission medium. The data is applied to the AC power lines by frequency modulating an FM carrier and supplying that modulated carrier to the power lines by way of a bandwidth limiting circuit. At the remote location, a resonant circuit in combination with a reject circuit receives the modulated FM carrier from the AC power lines and passes only an extremely limited band of FM signals to a tuned amplifier which, in turn, supplies the band-limited FM signals to a demodulator.

47 Claims, 2 Drawing Sheets

REMOTE CONTROL REPEATER

This application is a continuation-in-part of U.S. application Ser. No. 053,355 U.S. Pat. No. 4,829,570 and Ser. No. 127,793, U.S. Pat. No. 4,847,903 filed May 22, 1987 and Dec. 2, 1987, respectively.

BACKGROUND OF THE INVENTION

This invention relates to a repeater and, more particularly, to a repeater having particular application in transmitting data, such as remote control data, received at one location to a remote location via AC power lines, and from which remote location the data is recovered and re-transmitted.

In several applications, a common transmission medium is used to communicate several different types of information from one location to another. It is known to segregate individual data channels to facilitate such transmission; and desired data may be recovered by means of receiving circuitry that operates only with a particular channel. Such multiplexing of information typically employs frequency division multiplexing (FDM), time division multiplexing (TDM) and other conventional multiplexing techniques.

When the medium which is used to transmit information also is used to transmit power, as when conventional AC power lines, such as common household wiring, are used as the transmission medium, significant amounts of noise, interference and other disturbances tend to degrade and distort an information signal supplied to that transmission medium. This difficulty is compounded when plural information channels are applied to the transmission medium. For example, difficulties are encountered when AC power lines are used to transmit stereophonic audio signals This problem of interference, distortion and degradation of information signals has been solved in accordance with the techniques discovered by the present inventor and disclosed in copending applications Ser. Nos. 053,355 and 127,793, the disclosures of which are incorporated herein by reference.

Briefly, in the so-called wireless transmission systems disclosed in the aforementioned applications, left-channel and right-channel audio signals modulate separate FM carriers, and these FM signals are transmitted over AC power lines from a source location to a remote location whereat the audio signals are demodulated and used to drive respective output devices, such as left and right loudspeakers. Advantageously, the carrier frequencies of these respective FM carriers are selected such that an harmonic of one does not interfere with the fundamental or harmonic of the other. Of course, a more complete description of wireless transmission systems are found in these pending patent applications.

A typical application of the aforementioned wireless transmission systems is in so-called home entertainment systems. Typically, a source of audio signals, such as a magnetic tape player, a radio receiver, a phonograph record, a compact disk, or the like, is situated in one room of a user's home, and the loudspeakers which are used to reproduce the audio signals provided by that source are located in another room The household wiring provided in the user's home is used as the transmission medium to extend the audio signals from the source to the loudspeakers. A commercial embodiment of this wireless transmission home entertainment system is marketed by Recoton Corporation, the assignee of the present invention, under the designation "Wireless 100 Speaker System".

While the aforementioned wireless transmission system, and particularly the "Wireless 100 Speaker System" has met with commercial success, the fact that the audio signal source and sound reproducing devices are located in separate rooms means that the user must leave the room in which the audio signals are reproduced and enter the room in which the signal source is located if he wishes to make any adjustments in the tone quality or program content to which he is listening. For example, volume adjustments, base/treble adjustments, tape-changing, radio station tuning, disk program selection, or the like must be made directly at the audio signal source. Such adjustments have been simplified by the introduction of remote control units which, typically, are hand-held portable devices that are manually operated by the user to affect any one or more o the aforementioned adjustments. Usually, these devices communicate with the audio signal source by means of infra-red transmission; and infra-red data pulses are transmitted from the remote control unit to a compatible IR detector which recovers and interprets the data transmitted from the remote control unit For example, the data may be encoded as digital pulses, and these pulses are recovered and used to control respective functions. Such pulses may be encoded as different data "words", with each word identifying a particular function together with an incremental increase or decrease in that function In this fashion, volume may be incrementally increased or decreased, the radio broadcast station to which a radio receiver is tuned may be incrementally increased or decreased, base/treble functions may be incrementally increased or decreased, the particular one of several programs prerecorded on a compact disk may be incrementally selected, etc.

Most remote control devices available today operate by means of infra-red transmission, as aforementioned. Other remote control devices which had been commercially available previously utilized ultrasonic signals for transmitting data from the hand-held unit to the compatible detector, and still other devices transmitted data signals by means of low-power radio transmission. However, in all of these devices, and particularly those in which IR transmission is used, the remote control unit must be physically located in the very same room as the compatible detector. Indeed, with IR remote control devices, a line-of-sight is needed for proper operation. It is manifest that, heretofore, the advantages derived from wireless transmission systems, such as the Wireless 100 Speaker System, cannot be fully exploited if the user still must return to the room in which the audio signal source is located. Since many home entertainment systems which are available today utilize IR remote control devices, it is desirable to enable the user of a wireless transmission system to enjoy the use of an IR remote control device (or other wireless remote control devices) with which his home entertainment system may be furnished.

One approach to extending the range of an IR remote control device in a television viewing system is described in U.S. Pat. No. 4,509,211. As described in this patent, a video signal playback device, such as a VCR, is connected to a television receiver by means of conventional wires, such as coaxial cable, twin flat lead, or the like, to supply reproduced video signals from the VCR to the television receiver. An IR detector is connected to the very same wires and is located at the vicinity of the television receiver. Control signals are transmitted to this IR detector from a conventional hand-held remote control unit, and this data is converted to corresponding electrical signals which then are transmitted over these wires to an IR emitter located at the vicinity of the VCR. The data signals supplied via these wires to the IR emitter are converted to IR signals which, in turn, are emitted to the conventional IR detector normally provided at the VCR. Hence, conventional operating functions normally carried out by a VCR located in one room may be controlled from a different room by using a conventional hand-held IR-emitting remote control device.

Unfortunately, the aforementioned extended remote control arrangement relies upon the very same television transmission lines normally provided between a VCR and a television receiver as the transmission medium for the remote control data signals But, the use of separate information transmission lines, such as coaxial cables or twin flat leads, fully defeats the advantages and objectives of the wireless transmission system discussed above. Indeed, the primary purpose of utilizing household wiring as the transmission medium between an audio signal source and loudspeakers (or other audio signal utilization devices) is to avoid the need for stringing additional wires therebetween.

OBJECTS OF THE INVENTION

Therefore, it is an object of the present invention to provide an extended remote control arrangement by which an information source disposed at one location may be controlled from another, remote location, with the two locations being linked by AC power lines.

Another object of this invention is to provide a remote control arrangement which does not rely upon line-of-sight or proximity between a data emitting remote control unit and a data receiving unit.

A further object of this invention is to provide a repeater for transmitting data signals received at a first location to a second location for re-transmission to a detector, and wherein AC power lines link the two locations.

An additional object of this invention is to provide an extended remote control arrangement in which a hand-held controlling unit may be used to transmit data over AC power lines, such as household wiring, to a receiving unit, with the two units being located in separate rooms of a building.

A specific object of this invention is to provide apparatus which permits the user to operate a hand-held IR remote control device for controlling the operation of a controlled device which responds to IR data signals, and which does not limit the user to be present in the same room as the controlled device.

Various other objects, advantages and features of the present invention will be readily apparent from the ensuing detailed description, and the novel features will be particularly pointed out in the appended claims.

SUMMARY OF THE INVENTION

In accordance with this invention, a repeater is provided for receiving at a first location data, such as pulse data, transmitted thereto via a first transmission medium, such as IR transmission, transmitting that data over AC power lines to a second location and re-transmitting that data at the second location via a second transmission medium, which also may be IR transmission Data received at the first location is used to frequency modulate an FM carrier, and the frequency modulated signal is coupled to the AC power lines with limited bandwidth by means of a bandwidth limiting circuit The frequency modulated data is transmitted over the AC power lines and received by the combination of a resonant circuit tuned to the frequency of the FM carrier and a reject circuit which rejects signals of frequencies outside a limited bandwidth substantially centered on that carrier. The bandwidth-limited FM signals are supplied to a demodulator by a tuned amplifier which recovers the original data. This recovered data then is outputted to the second transmission medium. By using a resonant circuit, a reject circuit and a tuned amplifier, improved selectivity is provided to eliminate substantially all extraneous signals which lie outside a limited bandwidth centered on the FM carrier.

Preferably, data is coupled to and emitted from the repeater by means of IR transmission; but the present invention also contemplates the use of radio transmission or sound wave transmission.

As one aspect of this invention, the data signals transmitted to the repeater are in the form of chopped pulses, and the chopping component is eliminated from the frequency modulated signals that are transmitted over the AC power lines.

As another aspect of this invention, no FM carrier is supplied to the AC power lines in the absence of data.

In accordance with yet another aspect of this invention, even though the transmitted FM signals are substantially free of any chopping component, the FM demodulating circuitry that is coupled to the AC power lines includes a circuit for generating and restoring the chopping component to the recovered data pulses.

As yet another aspect of this invention, the resonant and reject circuits are formed as LC circuits to present a relatively low impedance to a band of frequencies substantially centered on the FM carrier and a relatively high impedance outside this band. The combination of these LC circuits and the tuned amplifier establish strong frequency selectivity to the FM data signals and effectively block information signals and noise outside a narrow band centered on the FM carrier.

As a s&ill further aspect of this invention, in the absence of receiving the FM carrier from the AC power lines, signals are inhibited from being coupled to the output circuitry of the repeater.

As another feature of this invention, a receiver is provided to receive data transmitted via AC power lines as a band-limited modulated FM carrier which may be mixed with other information in the form of other modulated carriers.

As a still further feature of this invention, a transmitter is provided for applying to AC power lines band-limited frequency modulated data signals with, preferably, a pass band less than approximately ±10% of the FM carrier frequency.

BRIEF DESCRIPTION OF THE DRAWINGS

The following detailed description, given by way of example, will best be understood in conjunction with the accompanying drawings in which.

DETAILED DESCRIPTION OF A PREFERRED EMBODIMENT

Although the present invention may be used to transmit data of a general type over AC power lines (also referred to herein as household wiring), a particular application thereof is to control from a remote location a home entertainment system, and will be described in this environment. For convenience, this invention is designated a "repeater" to describe its function to "repeat" data supplied thereto via one transmission medium such that this data can be re-transmitted via a second transmission medium. The first and second transmission media are interlinked by AC power lines; and neither of the first and second transmission media comprise AC power lines.

In the preferred embodiment, the data supplied to the repeater is comprised of pulses, preferably digital signals. However, this invention may be used with other pulse-representative information, such as PWM, PDM, PPM and other known pulse modulated formats.

Figure 1:
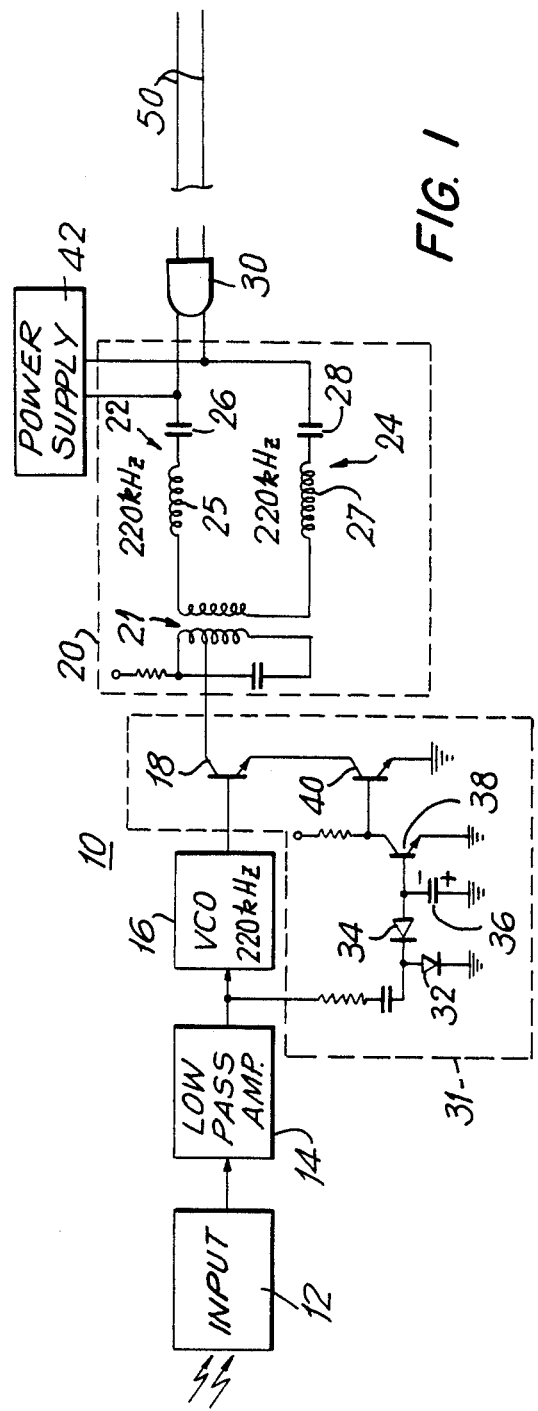
FIG. 1 is a partial block, partial schematic diagram of a transmitter used with the repeater of the present invention.
Figure 2:
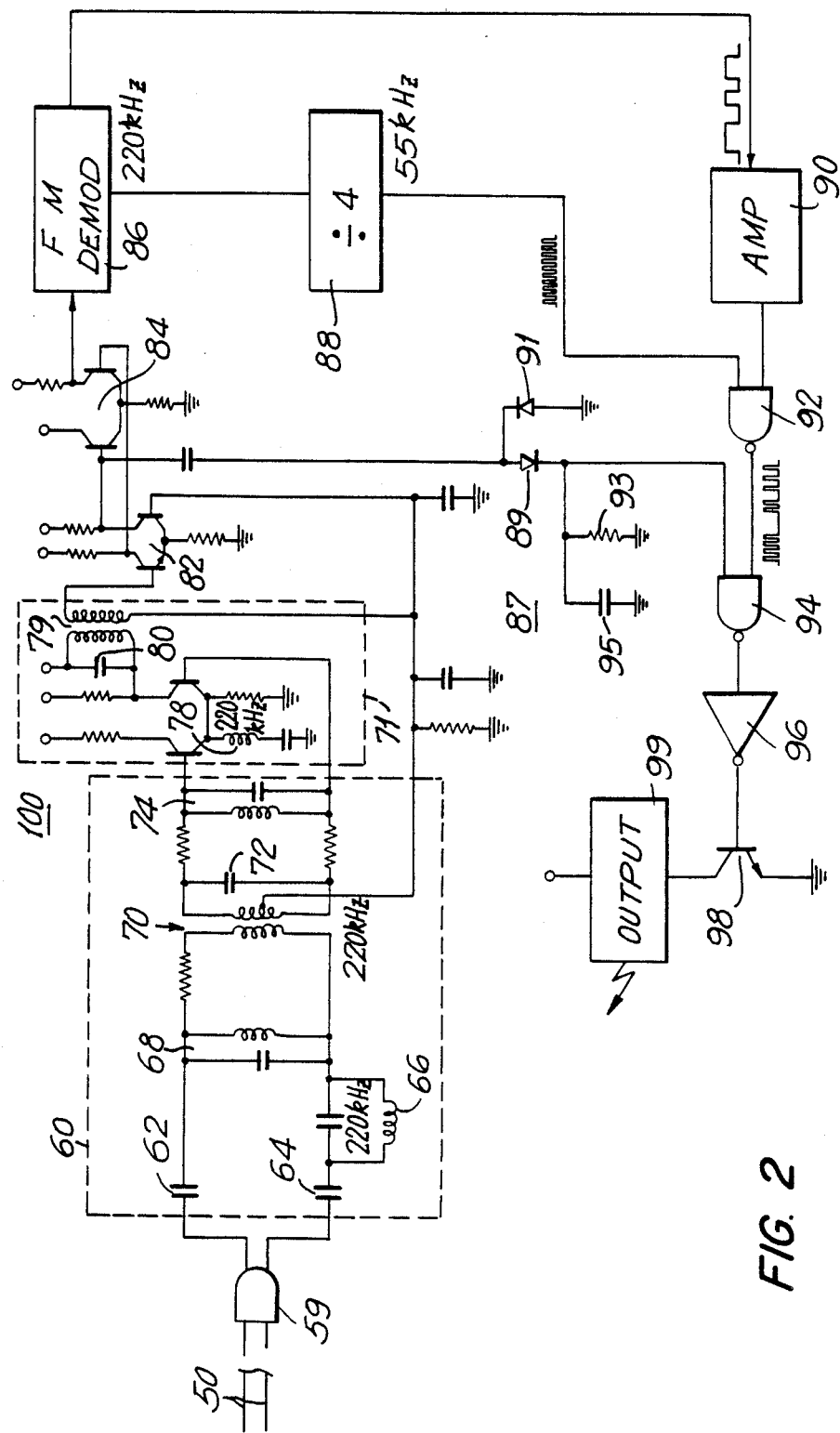
FIG. 2 is a partial block, partial schematic diagram of a receiver, used with the repeater of the present present invention.

The repeater is comprised of a transmitter 10, shown in FIG. 1, and a receiver 100, shown in FIG. 2. The transmitter and receiver are coupled to AC power lines 50 over which data signals are transmitted from transmitter 10 to receiver 100. Of course, AC power is present on AC power lines 50; and in addition thereto, it is contemplated that other modulated signals representing useful information also may be present. For example, and as described in aforementioned applications Ser. Nos. 053,355 and 127,793, left-channel and right-channel audio signals may be present in the form of frequency modulated carriers. As a numerical example, one carrier of 340 kHz may be frequency modulated to represent one of the stereophonic channels, and a carrier of approximately 485 kHz may be frequency modulated to represent the other stereophonic channel. As is readily apparent, it is desired that the data which is communicated from transmitter 10 to receiver 100 over AC power lines 50 should not interfere with the frequency modulated stereophonic information; nor should the FM stereophonic channel information interfere with this data.

In the environment of a home entertainment system, an audio signal source (such as a radio receiver, a tape deck, a compact disk player, a phonograph player, or the like) may be located in one room and loudspeakers which are used to reproduce the audio sounds supplied by the signal source may be located in another. As mentioned in the pending applications identified above, AC power lines are used to link the signal source with the loudspeakers; and it is expected that AC power lines 50, shown in FIGS. 1 and 2 herein, constitute the household wiring which is used for this purpose. The data which is transmitted by the repeater of the present invention typically constitutes remote control data for controlling sound volume, base/treble and program selection of the audio signal source. Such remotely controllable audio signal sources are known; and a portable, hand-held remote control unit having an infra-red emitter usually is used to transmit control data to an infra-red detector normally mounted on or adjacent the audio signal source. In addition to infra-red transmission, remote control devices are known which use sonic signals, and still others are known which use radio waves for controlling the audio signal source But, such remote control devices do not operate satisfactorily if the remote control unit is located in a different room than the audio signal source. The present invention overcomes this difficulty.

In use, it is expected that the user of the remote control unit is located in the same room as the loudspeakers, and the audio signal source is located in a separate room. Transmitter 10, which may be located in the vicinity of the loudspeaker, is adapted to pick up the control data, identified herein as control data pulses, and to transmit those pulses to AC power lines 50. Receiver 100 is adapted to receive the data pulses transmitted by transmitter 10 and to emit those pulses to the detector normally provided on or with the audio signal source. It will be appreciated that this invention is adapted to be used with conventional remote control devices; and the user need not obtain separate or special devices for use herewith. Rather, the remote control unit normally provided with the audio signal source may be used with the repeater of the present invention.

Transmitter 10 is comprised of an input unit 12, a frequency modulator 16, a bandwidth limiting circuit 20 and an inhibit circuit 31. Input unit 12 is adapted to receive remote control data pulses supplied thereto from the hand-held portable remote control unit normally used by the user of the present invention. When used with infra-red control data, input unit 12 is comprised of an infra-red detector which converts infra-red pulses into equivalent electrical pulse signals. If the remote control data pulses are formed as sonic or ultrasound pulses, input unit 12 comprises a sonic or ultrasound detector. Likewise, if the remote control data pulses are transmitted as radio waves, the input unit includes a radio receiver Thus, input unit 12 receives the remote control data pulses and converts those pulses to electrical equivalents.

Frequency modulator 16 preferably comprises a voltage controlled oscillator (VCO) having a carrier frequency of approximately 220 kHz. Preferably, the carrier frequency is increased by approximately 8 kHz in response to a pulse of positive magnitude (e.g. a binary "1") and the carrier frequency is reduced by approximately 8 kHz in response to a pulse of negative or ground potential (e.g. a binary "0"). In one embodiment thereof, modulator 16 produces an FM carrier whose bandwidth is approximately 15 kHz. Modulator 16 is coupled to input unit 12 by a low pass amplifier 14.

In some remote control units, infra-red data pulses are transmitted as chopped pulses to prevent inadvertent inference with the infra-red detector from spurious pulses which do not include a chopping pulse component. Typically, the chopping pulse frequency is on the order of 55 kHz, far in excess of the maximum data pulse frequency. However, for accurate transmission and reception of the chopping pulse component over the AC power lines, the bandwidth of the FM carrier (if that carrier is frequency modulated with the chopping pulses) should be twice the chopping pulse frequency. Thus, if the chopping pulse component is transmitted, the bandwidth of the frequency modulated data signal will be approximately 110 kHz. As will be described below in conjunction with FIG. 3, this wide bandwidth of the FM data carrier is not desired. Accordingly, low pass amplifier 14, which may be of conventional construction, is adapted to filter out the chopping pulse component and to supply modulator 16 only with the baseband data pulses The output of modulator 16 is coupled to bandwidth limiting circuit 20 by means of a drive transistor 18 which, as illustrated in FIG. 1, is included within inhibit circuit 31. As will be described, the function of the inhibit circuit is to selectively deactivate drive transistor 18 by rendering it non-conductive.

Bandwidth limiting circuit 20 is comprised of a tuned transformer 21 having a center-tapped primary winding coupled to the collector of drive transistor 18, the primary winding being connected in parallel with a tuning capacitor. Tuned transformer 21 is tuned to the FM carrier which, as described above, is assumed to be on the order of 220 kHz in the present embodiment. The secondary winding of tuned transformer 21 is coupled to a resonant circuit. More particularly, the output terminals of the tuned transformer secondary are coupled to resonant circuits 22 and 24, each resonant circuit being formed as a series-connected LC circuit. An inductor 25 is coupled to a capacitor 26 to constitute LC circuit 22 and an inductor 27 is coupled to a capacitor 28 to constitute LC circuit 24. These LC circuits are coupled to AC power lines 50 by means of a conventional plug 30.

Inhibit circuit 31 is comprised of a voltage doubler formed of diodes 32 and 34 and capacitor 36, the output of this voltage doubler being connected to a transistor 38 which, in turn, is coupled to a transistor switch 40, the latter being connected to the emitter of drive transistor 18 to selectively render the drive transistor conductive or non-conductive. The inhibit circuit is coupled to the output of low pass amplifier 14 for receiving the data pulses normally passed to modulator 16. Diodes 32 and 34 are poled such that, when data pulses are present, capacitor 36 is charged to a relatively negative potential. As shown, capacitor 36 is connected across the base-emitter circuit of transistor 38 such that, when the capacitor is charged to its negative level, transistor 38 (assumed herein to be an npn transistor) is rendered non-conductive. The collector electrode of transistor 38 is coupled to the base electrode of transistor switch 40, such that when transistor 38 is rendered non-conductive, transistor 40 is turned on to permit current to flow through the emitter of drive transistor 18. Conversely, when capacitor 36 is discharged, transistor 38 is rendered conductive to turn transistor switch 40 off and thereby inhibit emitter current from flowing through drive transistor 18.

A power supply circuit 42 is coupled to plug 30 to receive the AC power normally provided on household wiring 50. Although not shown herein, it will be appreciated that the power supply circuit is of conventional construction and is adapted to derive DC operating potentials from the AC power. These DC operating potentials are used to activate input unit 12, low pass amplifier 14 and modulator 16, as well as supply operating potential to the collector electrodes of drive transistor 18 and transistor 38.

Briefly, in operation, remote control data which is received by input unit 12 is amplified, and only the relatively lower frequency components of the amplified data is applied to modulator 16. Hence, if the remote control data comprises chopped data pulses, the chopping pulse component is removed and only lower frequency baseband data pulses are supplied to the modulator. The FM data carrier produced by the VCO included in modulator 16 is frequency modulated to represent the baseband data pulses. The FM data carrier is selectively coupled by means of drive transistor 18 to tuned transformer 21 and thence via resonant circuits 22 and 24 to plug 30 for transmission over AC power lines 50. Preferably, resonant circuits 22 and 24 are tuned to the 220 kHz data carrier and each resonant circuit exhibits a pass band less than approximately ±10% of the data carrier frequency. In the preferred embodiment, the pass band of each of these resonant circuits is approximately 15 kHz.

If data pulses are received by input unit 12, low pass amplifier 14 supplies baseband pulses to the voltage doubler circuit, whereupon capacitor 36 is charged to a relatively negative level. Accordingly, transistor 38 is cut off and switching transistor 40 is rendered conductive. Consequently, drive transistor 18 also is conductive; and the FM data carrier produced by modulator 16 is coupled to bandwidth limiting circuit 20. However, if input unit 12 does not receive data pulses, baseband pulses are not supplied by low pass amplifier 14 and capacitor 36 is discharged. As a result, transistor 38 is rendered conductive to lower its collector voltage; and transistor switch 40 is cut off. Drive transistor 18 thus is inhibited from coupling the data carrier from modulator 16 (which, at this time, is not modulated) to bandwidth limiting circuit 20.

Therefore, it will be seen that, in the absence of received data pulses, a carrier is not supplied by transmitter 10 to AC power lines 50.

Although inhibit circuit 31 is illustrated as being coupled to the output of low pass amplifier 14, it will be recognized that, if desired, the inhibit circuit may be coupled directly to the output of input unit 12.

Figure 3:
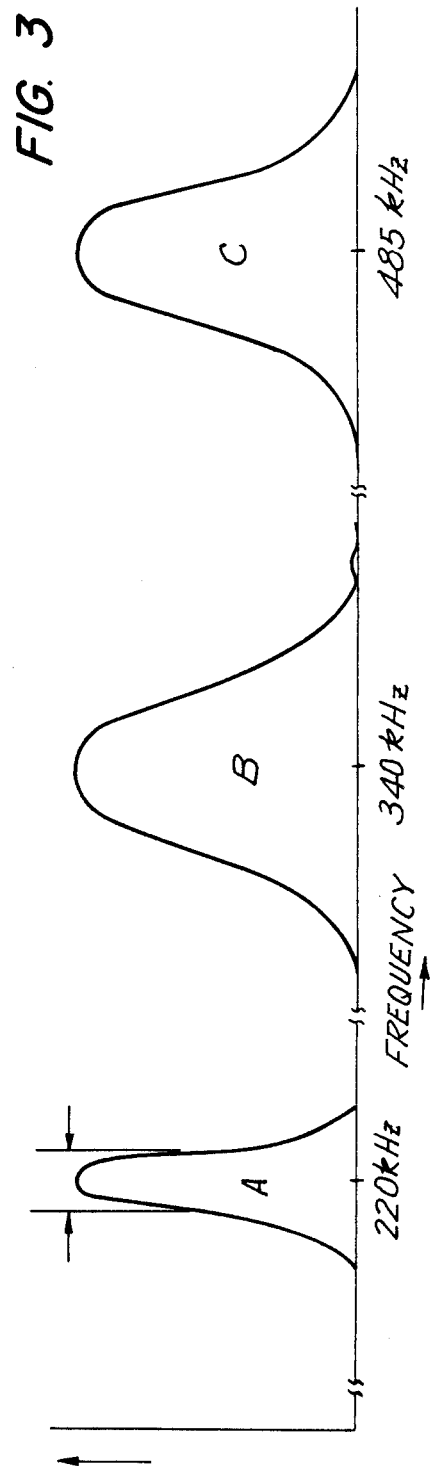
FIG. 3 is a diagram representing the frequency spectrum of signals supplied to the repeater of the present invention.

Before describing receiver 100 (FIG. 2), the advantages achieved by limiting the bandwidth of the FM data carrier supplied by transmitter 10 to AC power lines 50 now will be described with reference to the spectrum diagram of FIG. 3. The frequency spectrum of the FM data carrier produced by transmitter 10 is illustrated as waveform A, and the frequency spectra of the frequency modulated stereophonic signals with which the present invention may be used are illustrated as waveforms B and C. It is appreciated that the spectra represented as waveforms B and C are applied to AC power lines 50. To prevent interference between the frequency modulated data carrier (waveform A) and the lower frequency component of the FM stereophonic signals (waveform B), the bandwidth of the frequency modulated data carrier is sharply limited to approximately 15 kHz, as illustrated. If the chopping pulse component is not removed prior to modulating the data carrier, waveform A would have a bandwidth of approximately 110 kHz. This would present a likelihood of interference between the higher frequency portion of this bandwith with the lower frequency portion of spectrum B. Such interference not only could distort the data which is transmitted to receiver 100, but it also could degrade reception of the frequency modulated stereo channel. Furthermore, accurate discrimination, or selectivity, of the FM data carrier would be quite difficult. Such problems and difficulties are avoided by sharply limiting the bandwidth of the FM data carrier.

Turning now to FIG. 2, there is illustrated a partial block, partial schematic diagram of receiver 100 which is adapted to receive the frequency modulated data carrier supplied over AC power lines 50 and to convert the data information represented thereby to output (or emitted) remote control data pulses. Receiver 100 is comprised of a tuned receiving section 60, a tuned amplifier 71, an FM demodulator 86 and an output unit 99. Tuned receiving section 60 is coupled to AC power lines 50 by way of a plug 59. The tuned receiving section exhibits strong selectivity to pass the frequency modulated data carrier and to reject signal frequencies, including noise, that lie outside the aforementioned limited bandwidth of ±10% of the FM data carrier, or approximately 15 kHz.

The tuned receiving section includes a resonant circuit 66 tuned to the FM carrier in conjunction with a reject circuit 6$ which operates to reject signals of frequencies outside the aforementioned limited bandwidth. Both the resonant circuit and the reject circuit are comprised of LC circuits which, preferably, are formed of parallel-connected LC circuits. Resonant LC circuit 66 exhibits a resonant frequency of 220 kHz and is connected in series with AC power lines 50 by a coupling capacitor 64. It is appreciated that this resonant LC circuit exhibits a relatively low impedance to the frequency modulated data carrier and a relatively high impedance to signals outside the aforementioned limited bandwidth. Accordingly, this resonant circuit serves to pass the frequency modulated data carrier but effectively blocks those signals whose frequencies lie outside the bandwidth represented by waveform A of FIG. 3.

Reject LC circuit 68 is effectively connected in shunt across AC power lines 50 by means of coupling capacitor 62. This shunt circuit presents a relatively high impedance to the band of frequencies substantially centered on the FM data carrier, but exhibits a relatively low impedance to signals outside this band. As a consequence, any signals which might not be blocked by resonant LC circuit 66 are shunted back to the AC power lines and, thus, are effectively prevented from reaching tuned amplifier 71 and frequency demodulator 86.

A tuned transformer 70 is included in tuned receiving section 60 and is adapted to receive the frequency modulated data carrier passed by the resonant and reject LC circuits. Tuned transformer 70 includes a primary winding coupled by way of the resonant and reject circuits to plug 59, and also includes a center-tapped secondary winding whose output terminals are coupled to a parallel-connected tuning capacitor 72. To improve the selectivity of receiver 100 to the frequency modulated data carrier, tuned transformer 70 is tuned to the frequency of the FM data carrier.

Tuned amplifier 71 includes a differential amplifier formed of differentially connected transistors 76 whose base electrodes are effectively coupled across the secondary winding of tuned transformer 70. Noise signals which may be present on AC power lines 50 and which may pass through the resonant and reject circuits and also tuned transformer 70 appear as substantially equal signals on the power lines and, thus, remain as substantially equal signals at the output terminals of the tuned transformer. By way of the differential action exhibited by differential amplifier 76, these substantially equal noise signals tend to cancel each other. On the other hand, the frequency modulated data carrier appears as a differential signal across the output terminals of the secondary winding of tuned transformer 70. The differential amplifying operation carried out by differential amplifier 76 thus serves to amplify this FM data signal.

A still further LC circuit 74 is connected across the base electrodes of differentially-connected transistors 76. LC circuit 74 is tuned to the FM data carrier frequency and serves to provide still further selectivity to this FM data signal. Moreover, a series-connected LC circuit 78, tuned to the frequency of the data carrier, is coupled to the common-connected emitter electrodes of differentially-connected transistors 76. The impedance exhibited by LC circuit 78 is relatively low at the FM data carrier frequency, thereby increasing the signal gain of differential amplifier 76 and further improving the selectivity of receiver 100 to the data carrier.

The output of differential amplifier 76 is derived from the collector electrode of one of the differentially-connected transistors; and this output is coupled to a tuned transformer 79. As illustrated, a capacitor 80 is connected in parallel with the primary winding of tuned transformer 79, and this parallel circuit is connected in the collector circuit of one of the differentially-connected transistors. Tuned transformer 79 exhibits a resonant frequency substantially equal to the frequency of the data carrier.

The secondary of tuned transformer 79 is coupled to a first stage of cascaded amplifiers 82 and 84, each stage being connected as a differential amplifier. The secondary winding of tuned transformer 79 is connected to one input of differential amplifier 82 and the center cap of tuned transformer 70 is connected to the other input of this differential amplifier. As shown, a low pass filter is provided in this latter connection to supply a reference potential on the order of zero volts AC to this other input of differential amplifier 82. The band-limited frequency modulated carrier supplied to differential amplifier 82 is amplified in this stage and the amplified frequency modulated signal is supplied to cascaded amplifier stage 84 for further amplification. Amplifiers 82 and 84 both are illustrated as differentially-connected transistors, and the collector electrodes of both transistors included in amplifier 82 are connected to respective base electrodes of the transistors which constitute amplifier 84. It is, of course, fully appreciated that other cascaded amplifier stages may be used, if desired.

The output of amplifier stage 84 is coupled to frequency demodulator 86 which, in the preferred embodiment, is formed as a phase locked loop detector As is known, a phase locked loop detector includes a voltage controlled oscillator whose frequency, when used as a frequency demodulator, is substantially equal to the carrier frequency of the FM signal to be demodulated. Thus, in the present example, the frequency of the VCO included in frequency demodulator 86 is equal to the data carrier frequency of 220 kHz. As is known to those of ordinary skill in the art, an error signal is produced when the instantaneous frequency of the input signal supplied to the phased lock loop differs from the frequency then exhibited by the VCO. When used as a frequency demodulator, this error signal constitutes the demodulated information signal which, in the present instance, comprises recovered data. As illustrated, frequency demodulator 86 is provided with at least two outputs, one of which supplies the recovered remote control data and the other of which supplies the VCO signal whose frequency averages 220 kHz.

The recovered remote control data comprises pulse data of the type which had been used to modulate the data carrier at receiver 10. This recovered pulse data is coupled to an amplifier 90 which is adapted to amplify the pulse signal and supply same to a NAND gate 92.

The carrier signal provided by frequency demodulator 86 is coupled to a frequency divider 88 which, in the present example, divides the 220 kHz carrier frequency by a factor of 4 to produce a submultiple of the carrier whose frequency is equal to approximately 55 kHz. It is recalled that this is substantially the same frequency as the repetition rate exhibited by the chopping pulse component which may be received by input unit 12 but filtered out by low pass amplifier 14 included in transmitter 10. The output of frequency divider 88 is coupled as another input to NAND gate 92. It will be appreciated that NAND gate 92 functions to add a chopping pulse component to the data pulses recovered by frequency demodulator 86. Thus, if chopped remote control data pulses initially had been received by input unit 12 of transmitter 10, NAND gate 92 reproduces these chopped data pulses.

The output of NAND gate 92 is coupled to another NAND gate 94 which functions as an inhibit circuit to selectively block the recovered data pulses produced at the output of NAND gate 92. More particularly, in the absence of a data carrier received by receiver 100, NAND gate 94 is inhibited. To this effect, a data carrier detector 87 is coupled to, for example, the output of amplifier stage 82. It will be appreciated that carrier detector 87 may be coupled to the output of tuned receiving section 60 or to the output of tuned amplifier 71, or to any intermediate location provided in either of these circuits Carrier detector 87 is comprised of a peak detector formed of diodes 89 and 91 coupled to a capacitor 95. Diodes 89 and 91 may be poled so as to function as a voltage doubler; and in any event serve to charge capacitor 95 to a positive voltage level if a data carrier is present at the output of amplifier stage 82 (or at the output of any other circuit to which carrier detector 87 is connected). Preferably, a resistor 93 is connected in parallel with capacitor 95 to discharge the capacitor in the absence of a detected data carrier. As shown, the positive voltage level to which capacitor 95 may be charged is coupled to NAND gate 94. Thus, when the capacitor is discharged, NAND gate 94 is supplied with a relatively low voltage level and is inhibited thereby.

NAND gate 94 is coupled to an output drive transistor 98 by means of an inverting buffer 96 If desired, buffer 96 may be omitted, and NAND gate 94 may be formed merely as an AND gate. Drive transistor 98 is connected to an output unit 99 which, in turn, is in communication with the audio signal source to supply remote control signals thereto For example, if the audio signal source includes an infra-red detector, output unit 99 includes an infra-red emitter to transmit infra-red control signals in the form of infra-red data pulses to the audio signal source. Alternatively, if the audio signal source includes a sonic or ultrasonic detector, output unit 99 includes a sonic or ultrasound emitter compatible therewith. Still further, if the audio signal source includes a radio receiver, the output unit includes a compatible radio transmitter. This, output unit 99 cooperates with the remote control detector provided at the audio signal source as a functional substitute for the hand-held portable remote control unit normally used with the audio signal source.

Briefly, in operation, a band-limited frequency modulated data signal is coupled to plug 59 by AC power lines 50 from transmitter 10. It is appreciated that, in addition to the frequency modulated data signal, stereophonic FM signals whose spectral characteristics are of the type illustrated as waveforms B and C in FIG. 3 also may be coupled to plug 59. Still further, noise signals and other interference which may be picked up by the AC power lines, such as impulse noise, light dimmer noise, and the like, also may be present. The stereophonic FM signals and other noise are rejected by the cascaded LC circuits included in tuned receiving section 60. However, the frequency modulated data carrier is passed by this tuned receiving section to tuned amplifier 71. Thus, the cascaded LC circuits may be thought of as trapping out frequencies above the lowest frequencies included in the spectral characteristics exhibited by waveform B (FIG. 3). Likewise, dimmer noise and impulse noise also is blocked.

Tuned amplifier 71 functions to cancel random noise which may be present on AC power lines 50 and which may pass through tuned receiving section 60. Since this random noise appears equally on both leads of the AC power lines, this noise is effectively cancelled by the differential operation of differential amplifier 76.

LC circuit 78 and tuned transformer 99 further enhance the selectivity of receiver 100 to the frequency modulated data carrier Accordingly, the output of tuned amplifier 71 consists essentially of the FM data carrier, and this frequency modulated signal is further amplified by amplifier stages 82 and 84.

The amplified frequency modulated data signal is demodulated by frequency demodulator 86; and the recovered data pulses produced at the output of the frequency demodulator are gated with a recovered, frequency-divided data carrier. As a result, NAND gate 92 produces chopped data pulses which are substantially similar to the chopped data pulses which may have been transmitted originally to input unit 12 of transmitter 10. Although not shown, a simple switch may be provided between frequency demodulator 86 and frequency divider 88 or between the frequency divider and NAND gate 92 to block the 55 kHz chopping pulse from being supplied to the NAND gate in the event that the repeater herein is used with a remote control unit that does not transmit chopped data pulses.

The recovered data pulses, whether or not chopped, are coupled to drive transistor 98 which, in turn, drives output unit 99 to re-transmit the recovered data pulses. In the absence of a received FM data carrier, capacitor 95 is not charged and, thus, NAND gate 94 is inhibited from coupling the recovered data pulses to the drive transistor. This prevents spurious signals from being supplied to output unit 99 and avoids the transmission of erroneous information from the output unit to the audio signal source in the absence of received authentic data.

Thus, it is appreciated that data pulses (or other data information) transmitted from a hand-held portable remote control unit located in one room is coupled by means of AC power lines to an emitting device provided in output unit 99 and located in another room in communication with the remote control detector normally used with the hand-held unit. While the present invention has been described in the environment of a home entertainment system, whereby remote control data pulses are transmitted to an audio signal source, it is readily appreciated that other applications are contemplated. For example, the present invention may be used to telemeter information from one site to another using AC power lines as the site-connection transmission medium. As another example, the present invention may be used to control a household appliance (or other controllable device) by transmitting control signals to the transmitter section of the repeater described herein, and by locating the receiving section of the repeater in proper communication with the controlled device.

Although the present invention has been described as being used to receive and subsequently transmit pulse information, it will be appreciated that the teachings herein may be adapted to receive and transmit other useful information in different formats. Preferably, however, the frequency modulated data signals which are transmitted and received over AC power lines 50 exhibit a limited bandwidth to avoid interference with other information signals which may be present on the AC power lines and to permit selectivity at the receiver so as to reject noise and other interference.

Accordingly, although the present invention has been shown and described with reference to a preferred embodiment, it will be readily appreciated by those of ordinary skill in the art that various changes and modifications may be made without departing from the spirit and scope of the present invention. It is intended that the appended claims be interpreted as including the disclosed invention as well as other equivalents thereto.

What is claimed is:

1. A repeater for receiving at a first location data transmitted thereto via a first transmission medium, transmitting said data over AC power lines to a second location and re-transmitting said data at said second location via a second transmission medium, wherein said first and second transmission media do not constitute AC power lines, said repeater comprising:
   input means for receiving said data transmitted to said first location;
   FM means for frequency modulating a predetermined FM carrier with the data;
   bandwidth limiting means coupled to said FM means for supplying the frequency modulated FM carrier to said AC power lines with limited bandwidth;
   receiving means for receiving said frequency modulated FM carrier transmitted on said AC power lines and including resonant circuit means tuned to the frequency of said FM carrier for passing a limited bandwidth, and reject means for rejecting signals of frequencies outside said limited bandwidth;
   tuned amplifying means coupled to said receiving means and tuned to said FM carrier frequency for amplifying said frequency modulated FM carrier;
   demodulating means coupled to said tuned amplifying means for frequency demodulating said frequency modulated FM carrier to recover said data; and
   output means coupled to said demodulating means for outputting the recovered data to said second transmission medium.

2. The repeater of claim 1 wherein the first and second transmission media are the same.

3. The repeater of claim 2 wherein said input means includes radio signal detecting means for detecting data signal radio waves; and wherein said output means includes radio wave emitting means for emitting data signal radio waves.

4. The repeater of claim 1 wherein said received data comprises chopped data pulses and said input means includes means for removing chopping pulses from the data pulses and for supplying said data pulses to said FM means.

5. The repeater of claim 1 wherein each of said resonant circuit means and said reject means comprises an LC circuit.

6. The repeater of claim 5 wherein each said LC circuit comprises a parallel-connected LC circuit.

7. A receiver adapted to receive data transmitted as a modulated FM carrier via AC power lines on which other information in the form of other modulated carriers also may be present, said receiver comprising:
   input means for receiving said modulated FM carrier from said AC power lines and including bandpass/band-reject means tuned to said FM carrier for passing a narrow frequency band substantially centered on the modulated FM carrier and for rejecting substantially all frequencies outside said narrow frequency band;
   amplifying means coupled to said input means for amplifying the passed modulated FM carrier;
   demodulating means coupled to said amplifying means for demodulating the modulated FM carrier to recover said data therefrom;
   output means responsive to the recovered data for re-transmitting the recovered data to further means; and
   coupling means for selectively coupling said recovered data from said demodulating means to said output means if said modulated FM carrier is passed to said amplifying means.

8. A repeater for receiving at a first location data in the form of infra-red data transmitted thereto via a first transmission medium, transmitting said data over AC power lines to a second location and re-transmitting said infra-red data at said second location via a second transmission medium, wherein said first and second transmission media are the same and do not constitute AC power lines, said repeater comprising:
   input means including infra-red detection means for detecting and receiving said infra-red data transmitted to said first location;
   FM means for frequency modulating a predetermined FM carrier with the data;
   bandwidth limiting means coupled to said FM means for supplying the frequency modulated FM carrier to said AC power line with limited bandwidth;
   receiving means for receiving said frequency modulated FM carrier transmitted on said AC power lines and including resonant circuit means tuned to the frequency of said FM carrier for passing a limited bandwidth, and reject means for rejecting signals of frequencies outside said limited bandwidth;
   tuned amplifying means coupled to said receiving means and tuned to aid FM carrier frequency for amplifying said frequency modulated FM carrier;
   demodulating means coupled to said tuned amplifying means for frequency demodulating said frequency modulated FM carrier to recover said data; and
   output means coupled to said demodulating means and including infra-red emitting means for emitting infra-red recovered data to said second transmission medium.

9. A repeater for receiving a first location data in the form of sound waves transmitted thereto via a first transmission medium, transmitting said data over AC power lines to a second location and re-transmitting said sound wave data at said second location via a second transmission medium, wherein said first and second transmission media are the same and do not constitute AC power lines, said repeater comprising:
   input means including sound wave detecting means for detecting and receiving said sound wave data transmitted to said first location;

FM means for frequency modulating a predetermined FM carrier with the data;

bandwidth limiting means coupled to said FM means for supplying the frequency modulated FM carrier to said AC power lines with limited bandwidth;

receiving means for receiving said frequency modulated FM carrier transmitted on said AC power lines and including resonant circuit means tuned to the frequency of said FM carrier for passing a limited bandwidth, and reject means for rejecting signals of frequencies outside said limited bandwidth;

tuned amplifying means coupled to said receiving means and tuned to sad FM carrier frequency for amplifying said frequency modulated FM carrier;

demodulating means coupled to said tuned amplifying means for frequency demodulating said frequency modulated FM carrier to recover said data; and output means coupled to said demodulating means and including sound wave emitting means for emitting sound wave recovered data to said second transmission medium.

10. A repeater for receiving at a first location data transmission thereto via a first transmission medium, transmitting said data over AC power lines to a second location and re-transmitting said data at said second location via a second transmission medium, wherein said first and second transmission media do not constitute AC power lines, said repeater comprising:

input means for receiving said data transmitted to said first location;

FM means for frequency modulating a predetermined FM carrier with the data;

bandwidth limiting means coupled to said FM means for supplying the frequency modulated FM carrier to said AC power lines with limited bandwidth;

inhibit means responsive to the absence of data received by said input means for inhibiting said frequency modulated FM carrier from being supplied to said AC power lines;

receiving means for receiving said frequency modulated FM carrier transmitted on said AC power lines and including resonant circuit means tuned to the frequency of said FM carrier for passing a limited bandwidth, and reject means for rejecting signals of frequencies outside said limited bandwidth;

tuned amplifying means coupled to said receiving means and tuned to said FM carrier frequency for amplifying said frequency modulated FM carrier;

demodulating means coupled to said tuned amplifying means for frequency demodulating said frequency modulated FM carrier to recover said data; and output means coupled to said demodulating means for outputting the recovered data to said second transmission medium.

11. The repeater of claim 10 wherein said inhibit means comprises drive means for driving said bandwidth limiting means with said frequency modulated FM carrier, and means for deactivating said drive means in the absence of data received by said input means.

12. The repeater of claim 11 wherein said drive means comprises transistor means having an emitter electrode; and said means for deactivating said drive means comprises semiconductor switch means coupled to said emitter electrode, and means for rendering said semiconductor switch means conductive only when data is received by said input means.

13. A repeater for receiving a first location data transmitted thereto via a first transmission medium, transmitting said data over AC power lines to a second location and re-transmitting said data at said second location via a second transmission medium, wherein said first and second transmission media do not constitute AC power lines, said repeater comprising:

input means for receiving said data transmitted to said first location;

FM means for frequency modulating a predetermined FM carrier with the data;

bandwidth limiting means coupled to said FM means for supplying the frequency modulated FM carrier to said AC power lines with limited bandwidth, said bandwidth limiting means comprises tuned transformer means coupled to said FM means and tuned to the frequency of said predetermined FM carrier, and output resonant circuit means for coupling said tuned transformer means to said AC power lines;

receiving means for receiving said frequency modulated FM carrier transmitted on said AC power lines and including resonant circuit means tuned to the frequency of said FM carrier for passing a limited bandwidth, and reject means for rejecting signals of frequencies outside said limited bandwidth;

tuned amplifying means coupled to said receiving means and tuned to said FM carrier frequency for amplifying said frequency modulated FM carrier;

demodulating means coupled to said tuned amplifying means for frequency demodulating said frequency modulated FM carrier to recover said data; and output means coupled to said demodulating means for outputting the recovered data to said second transmission medium.

14. The repeater of claim 13 wherein said output resonant circuit means comprises a pair of LC circuits.

15. The repeater of claim 13 wherein said tuned transformer means includes a secondary winding having first and second terminals; and said output resonant circuit means comprises first and second series-connected LC circuits coupled between said first and second terminals and said AC power lines, respectively.

16. The repeater of claim 15 wherein each of said series-connected LC circuits is tuned to said predetermined FM carrier frequency and has a pass band of approximately 15 kHz.

17. A repeater for receiving a first location data transmitted thereto via a first transmission medium, transmitting said data over AC power lines to a second location and re-transmitting said data at said second location via a second transmission medium, where said first and second transmission media do not constitute AC power lines, said repeater comprising:

input means for receiving said data transmitted to said first location;

FM means for frequency modulating a predetermined FM carrier with the data;

bandwidth limiting means coupled to said FM means for supplying the frequency modulated FM carrier to said AC power lines with limited bandwidth;

receiving means for receiving said frequency modulated FM carrier transmitted on said AC power lines and including resonant circuit means tuned to the frequency of said FM carrier for passing a limited bandwidth, and reject means for rejecting signals of frequencies outside said limited bandwidth;

tuned amplifying means coupled to said receiving means and tuned to said FM carrier frequency for amplifying said frequency modulated FM carrier;

demodulating means coupled to said tuned amplifying means for frequency demodulating said frequency modulated FM carrier to recover baseband data pulses from said frequency modulated FM carrier; and output means coupled to said demodulating means and including modulating means for modulating said baseband data pulses with a predetermined data carrier whose frequency is substantially different from that of the frequency modulated FM carrier and for outputting the recovered data to said second transmission medium.

18. The repeater of claim 17 wherein said demodulating means includes means for recovering a submultiple of said FM carrier; and wherein the modulating means included in said output means includes gating means for gating said submultiple of said FM carrier with said baseband data pulses.

19. A repeater for receiving at a first location data transmitted thereto via a first transmission medium, transmitting said data over AC power lines to a second location and re-transmitting said data at said second location via a second transmission medium, wherein said first and second transmission media do not constitute AC power lines, said repeater comprising:

input means for receiving said data transmitted to said first location;

FM means for frequency modulating a predetermined FM carrier with the data;

bandwidth limiting means coupled to said FM means for supplying the frequency modulated FM carrier to said AC power lines with limited bandwidth;

receiving means for receiving said frequency modulated FM carrier transmitted on said AC power lines and including resonant circuit means comprising an LC circuit and tuned to the frequency of said FM carrier for passing a limited bandwidth, and reject means comprising an LC circuit for rejecting signals of frequencies outside said limited bandwidth, wherein, the resonant LC circuit is effectively connected in series with said AC power lines to present a relatively low impedance to a band of frequencies substantially centered on said FM carrier and a relatively high impedance outside said band, and the reject LC circuit is effectively connected in shunt across said AC power lines to present a relatively high impedance to said band of frequencies and a realtively low impedance outside said band;

tuned amplifying means coupled to said receiving means and tuned to said FM carrier frequency for amplifying said frequency modulated FM carrier;

demodulating means coupled to said tuned amplifying means for frequency demodulating said frequency modulated FM carrier to recover said data; and output means coupled to said demodulating means for outputting the recovered data to said second transmission medium.

20. A repeater for receiving at a first location data transmitted thereto via a first transmission medium, transmitting said data over AC power lines to a second location and re-transmitting said data at said second location via a second transmission medium, wherein said first and second transmission media do not constitute AC power lines, said repeater comprising:

input means for receiving said data transmitted to said first location;

FM means for frequency modulating a predetermined FM carrier with the data;

bandwidth limiting means coupled to said FM means for supplying the frequency modulated FM carrier to said AC power lines with limited bandwidth;

receiving means for receiving said frequency modulated FM carrier transmitted on said AC power lines and including resonant circuit means comprising an LC circuit and tuned to the frequency of said FM carrier for passing a limited bandwidth, and reject means comprising an LC circuit for rejecting signals of frequencies outside said limited bandwidth;

tuned transformer means connected to receive the frequency modulated FM carrier passed by the resonant and reject LC circuits, said tuned transformer means being tuned to the frequency of the FM carrier;

tuned amplifying means coupled to said receiving means and tuned to said FM carrier frequency for amplifying said frequency modulated FM carrier;

demodulating means coupled to said tuned amplifying means for frequency demodulating said frequency modulated FM carrier to recover said data; and output means coupled to said demodulating means for outputting the recovered data to said second transmission medium.

21. The repeater of claim 20 wherein said tuned amplifying means includes a differential amplifier having a pair of inputs coupled across said tuned transformer means.

22. The repeater of claim 21 wherein said tuned amplifying means further includes an additional LC circuit tuned to the frequency of the FM carrier and coupled across the pair of inputs of said differential amplifier.

23. The repeater of claim 22 wherein said differential amplifier includes differentially-connected transistors having common-connected emitter electrodes, and further comprising a further LC circuit tuned to the frequency of the FM carrier and coupled to said common-connected emitter electrodes.

24. The repeater of claim 21 wherein said differential amplifier includes an output, and further comprising additional tuned transformer means coupled to the differential amplifier output and having a resonant frequency substantially equal to the frequency of the FM carrier for supplying the frequency modulated FM carrier to said demodulating means.

25. The repeater of claim 24 further comprising an additional amplifier stage connected between said additional tuned transformer means and said demodulating means.

26. The repeater of claim 21 further comprising detecting means for detecting the presence of the FM carrier at the output of said differential amplifier; and inhibit means coupled to said output means and responsive to said detecting means for inhibiting said output means from outputting recovered data in the absence of said FM carrier.

27. The repeater of claim 26 wherein said detecting means comprises peak detecting means including capacitance means to be charged in response to said FM carrier and means for discharging said capacitance means in the absence of said FM carrier.

28. The repeater of claim 27 wherein said inhibit means comprises a gate circuit coupled to said demodulating means for receiving the recovered data and including an enable input coupled to said capacitance means, said gate circuit passing said recovered data when said capacitance means is charged.

29. The repeater of claim 25 wherein said demodulating means comprises phase locked loop means having a voltage controlled oscillator for generating an oscillating signal of a frequency substantially equal to the frequency of the FM carrier, said phase locked loop means having a data output for providing said recovered data and an oscillating signal output for providing said oscillating signal; and further comprising frequency dividing means coupled to said oscillating signal output for dividing the frequency of said oscillating signal, and gating means coupled to said frequency dividing means and to said data output for gating said recovered data with a frequency-divided oscillating signal.

30. A receiver adapted to receive data transmitted as a modulated FM carrier via AC power lines on which other information in the form of other modulated carriers also maybe present, said receiver comprising:
input means for receiving said modulated FM carrier from said AC power lines and including band-pass/band-reject means tuned to said FM carrier for passing a narrow frequency band substantially centered on the modulated FM carrier and for rejecting substantially all frequencies outside said narrow frequency band wherein, said band-pass/band-reject means comprises plural LC circuits connected in cascade, at least one of said LC circuits presenting a relatively low impedance to said narrow frequency band, and at least another of said LC circuits presenting a relatively high impedance to signals of a frequency above said narrow frequency band;
amplifying means coupled to said input means for amplifying the passed modulated FM carrier;
demodulating means coupled to said amplifying means for demodulating the modulated FM carrier to recover said data therefrom;
output means responsive to the recovered data for retransmitting the recovered data to further means; and
coupling means for selectively coupling said recovered data from said demodulating means to said output means if said modulated FM carrier is passed to said amplifying means.

31. The receiver of claim 30 wherein said plural LC circuits further include tuned transformer means having a resonant frequency substantially equal to the FM carrier frequency.

32. The receiver of claim 31 wherein said input means further includes a differential amplifier having inputs coupled to said tuned transformer means for receiving the modulated FM carrier differentially supplied thereto by said tuned transformer means 33. The receiver of claim 32 wherein said plural LC circuits further include an LC circuit coupled across the inputs of said differential amplifier.

34. The receiver of claim 33 wherein each of said LC circuits comprises an inductor in parallel with a capacitor.

35. The receiver of claim 33 further comprising second tuned transformer means having a resonant frequency substantially equal to the FM carrier frequency for coupling the modulated FM carrier from said differential amplifier to said amplifying means.

36. The receiver of claim 35 wherein said differential amplifier comprises a pair of transistor means connected in differential configuration and having common-connected emitter electrodes, and a further LC circuit coupled to said common-connected emitter electrodes and having a resonant frequency substantially equal to the FM carrier frequency.

37. The receiver of claim 35 wherein said amplifying means comprises plural differential amplifiers connected in cascade.

38. The receiver of claim 35 wherein said coupling means comprises gate means for gating said recovered data to said output means, capacitance means for enabling said gate means, and charging means for charging said capacitance means when said FM carrier is coupled to said amplifying means.

39. A receiver adapted to receive data transmitted as a modulated FM carrier via AC power lines on which other information in the form of other modulated carriers also may be present, said receiver comprising:
input means for receiving said modulated FM carrier from said AC power lines and including band-pass/band-reject means tuned to said FM carrier for passing a narrow frequency band substantially centered on the modulated FM carrier and for rejecting substantially all frequencies outside said narrow frequency band;
amplifying means coupled to said input means for amplifying the passed modulated FM carrier;
demodulating means coupled to said amplifying means for demodulating the modulated FM carrier to receiver said data therefrom wherein, said demodulating means comprises phase locked loop detecting means including oscillating means for generating a repetitive signal of frequency equal to the FM carrier frequency, frequency dividing means for dividing the frequency of said repetitive signal by a predetermined amount, and gating means for gating the recovered data with the frequency divided repetitive signal;
output means responsive to the recovered data for retransmitting the recovered data to further means; and
coupling means for selectively coupling said recovered data from said demodulating means to said output mans if said modulated FM carrier is passed to said amplifying means.

40. A transmitter for applying data to AC power lines for transmission over said AC power lines to a remote location, comprising:
input means to which said data is applied;
FM modulating means coupled to said input means for frequency modulating a carrier with said data; and
resonant circuit means tuned to the frequency of said carrier and exhibiting a pass band less than approximately ±10% of said carrier frequency for supplying said frequency modulated carrier to said AC power lines with limited bandwidth wherein, said resonant circuit means comprises a tuned transformer coupled to LC circuit means connected in series with said AC power lines.

41. The transmitter of claim 40 wherein said tuned transformer includes a primary winding coupled to said FM modulating means and a secondary winding having first and second terminals; and wherein said LC circuit means comprises first and second LC circuits coupled to said first and second terminals, respectively, of said secondary winding.

42. The transmitter of claim 41 wherein said primary winding includes a center tap, and further comprising drive means coupled to said FM modulating means for applying said frequency modulated carrier to said center tap, and inhibit means coupled to said input means for inhibiting the operation of said drive means in the absence of data.

43. A transmitter for applying data to AC power lines for transmission over said AC power lines to a remote location, comprising:
   input means to which said data is applied;
   FM modulating means coupled to said input means for frequency modulating a carrier with said data;
   resonant circuit means tuned to the frequency of said carrier and exhibiting a pass band less than approximately ±10% of said carrier frequency for supplying said frequency modulated carrier to said AC power lines with limited bandwidth; and
   selectively enabled coupling means responsive to the presence of data applied to said input means for coupling the frequency modulated carrier from said FM modulating means to said resonant circuit means wherein, said selectively enabled coupling means comprises drive means for supplying said frequency modulated carrier to said resonant circuit means, capacitance means responsive to the presence of data for charging to a charged level, and means responsive to the charged level of said capacitance means to energize said drive means.

44. A transmitter for applying data received in the form of infra-red data pulses for transmission over AC power lines to a remote location, said transmitter comprising:
   input means including an infra-red detector to which said infra-red data pulses are applied;
   FM modulating means coupled to said input means for frequency modulating a carrier with said data; and
   resonant circuit means tuned to the frequency of said carrier and exhibiting a pass band less than approximately ±10% of said carrier frequency for supplying said frequency modulated carrier to said AC power lines with limited bandwidth.

45. The transmitter of claim 44 wherein said infra-red data pulses comprises chopped data pulses, and said input means further includes a low pass amplifying means having a frequency pass band below the frequency of the chopping pulses to recover baseband data pulses from received chopped data pulses.

46. A transmitter for applying data to AC power lines for transmission over said AC power lines to a remote location, comprising:
   input means to which said data is applied;
   FM modulating means coupled to said input means for frequency modulating a carrier with said data;
   resonant circuit means tuned to the frequency of said carrier and exhibiting a pass band less than approximately ±10% of said carrier frequency for supplying said frequency modulated carrier to said AC power lines with limited bandwidth wherein, said resonant circuit means comprises a tuned transformer coupled to LC circuit means connected in series with said AC power lines; and
   coupling means selectively enabled and responsive to the presence of data applied to said input means for coupling the frequency modulated carrier from said FM modulating means to said resonant circuit means.

47. A transmitter for applying data to AC power lines for transmission over said AC power lines to a remote location, comprising:
   input means to which said data is applied;
   FM modulating means coupled to said input means for frequency modulating a carrier with said data; and
   resonant circuit means tuned to the frequency of said carrier and exhibiting a pass band of approximately 15 kHz for supplying said frequency modulated carrier to said AC power lines with limited bandwidth wherein, said resonant circuit means comprises a tuned transformer coupled to LC circuit means connected in series with said AC power lines.

* * * * *